(12) United States Patent  
Reid et al.

(10) Patent No.: US 8,619,421 B2
(45) Date of Patent: *Dec. 31, 2013

(54) PORTABLE COMPUTER HARD DRIVE STRUCTURES

(75) Inventors: Gavin Reid, Campbell, CA (US); Ron Hopkinson, Campbell, CA (US); Cheng P. Tan, Fremont, CA (US); John Brock, San Francisco, CA (US); Chris Ligtenberg, San Carlos, CA (US); Bartley K. Andre, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/458,628

(22) Filed: Apr. 27, 2012

(65) Prior Publication Data

US 2012/0212891 A1 Aug. 23, 2012

Related U.S. Application Data

(63) Continuation of application No. 12/340,574, filed on Dec. 19, 2008, now Pat. No. 8,179,673.

(60) Provisional application No. 61/105,041, filed on Oct. 13, 2008.

(51) Int. Cl.
*G06F 1/16* (2006.01)

(52) U.S. Cl.
USPC .................. 361/679.47; 312/236; 248/309.1; 710/303

(58) Field of Classification Search
USPC .......... 312/334.16, 223.1, 223.2, 334.7, 236, 312/265.5, 222, 257.1, 405, 334.29, 312/334.47; 248/618, 636, 316.5, 425, 248/309.1, 220.22, 206.2, 442.2, 205.3, 248/918, 487; 710/303, 304; 361/679.47, 361/679.35, 679.36, 679.34, 679.09, 361/679.27, 679.55, 679.21, 679.33, 679.3, 361/679.37, 679.48, 679.49, 679.06
See application file for complete search history.

(56) References Cited

U.S. PATENT DOCUMENTS

| | | |
|---|---|---|
| 3,568,139 A | 3/1971 | Delzer |
| 4,224,383 A | 9/1980 | Taylor |
| 4,270,827 A | 6/1981 | Potgieter |
| 4,473,264 A | 9/1984 | Julian et al. |
| 4,920,018 A | 4/1990 | Turner |
| 4,991,058 A | 2/1991 | Watkins et al. |
| 5,155,662 A | 10/1992 | I-Shou |
| 5,169,338 A | 12/1992 | Dewar et al. |
| 5,187,643 A | 2/1993 | I-Shou |
| 5,323,291 A | 6/1994 | Boyle et al. |
| 5,325,984 A | 7/1994 | Ady et al. |
| 5,346,407 A | 9/1994 | Hood |
| 5,566,048 A | 10/1996 | Esterberg et al. |

(Continued)

*Primary Examiner* — Hung Duong
(74) *Attorney, Agent, or Firm* — Treyz Law Group; David C. Kellogg; G. Victor Treyz

(57) ABSTRACT

Portable computer structures are provided. The portable computer structures may include hard drive mounting structures. The hard drive mounting structures may include elastomeric support members. Each elastomeric support member may have a relatively rigid inner portion. The inner portion may include a hole that receives a hard drive mounting pin. Each elastomeric support member may also have a relatively flexible outer portion. The relatively flexible outer portion may be mounted within an opening in a plastic support member. The rigid inner portion may have a square outline and may be mounted within a square opening in the flexible outer portion.

15 Claims, 6 Drawing Sheets

(56) References Cited

U.S. PATENT DOCUMENTS

| | | |
|---|---|---|
| 5,572,402 A | 11/1996 | Jeong |
| 5,670,267 A | 9/1997 | Lee |
| 5,706,148 A | 1/1998 | Faris |
| 5,808,864 A | 9/1998 | Jung |
| 5,895,440 A | 4/1999 | Proctor et al. |
| RE36,381 E | 11/1999 | Boyle et al. |
| 6,015,196 A | 1/2000 | Welch et al. |
| 6,068,520 A | 5/2000 | Winings et al. |
| 6,249,426 B1 | 6/2001 | O'Neal et al. |
| 6,297,946 B2 | 10/2001 | O'Neal et al. |
| 6,304,060 B1 | 10/2001 | Demichi |
| 6,304,433 B2 | 10/2001 | O'Neal et al. |
| 6,413,120 B1 | 7/2002 | Winings |
| 6,461,711 B1 | 10/2002 | Ishida et al. |
| 6,477,035 B1 | 11/2002 | Cepas et al. |
| 6,483,719 B1 | 11/2002 | Bachman |
| 6,501,644 B1 | 12/2002 | Silverman et al. |
| 6,606,242 B2 | 8/2003 | Goodman et al. |
| 6,660,427 B1 | 12/2003 | Hukill et al. |
| 6,751,484 B1 | 6/2004 | Sandelius et al. |
| 6,781,827 B2 | 8/2004 | Goodman et al. |
| 6,839,228 B2 * | 1/2005 | Choi ................ 361/679.33 |
| 6,879,259 B1 | 4/2005 | Smith et al. |
| 6,887,616 B2 | 5/2005 | Kim et al. |
| 7,013,558 B2 | 3/2006 | Bachman |
| 8,179,673 B2 * | 5/2012 | Reid et al. ............ 361/679.47 |
| 2005/0206058 A1 | 9/2005 | Masterson et al. |
| 2006/0012969 A1 | 1/2006 | Bachman |
| 2006/0141344 A1 | 6/2006 | Chen et al. |
| 2006/0172183 A1 | 8/2006 | Chen et al. |
| 2007/0031727 A1 | 2/2007 | Hsu |
| 2007/0111086 A1 * | 5/2007 | Li et al. ..................... 429/97 |
| 2007/0117598 A1 | 5/2007 | Yang et al. |
| 2007/0151751 A1 | 7/2007 | Robbins et al. |
| 2008/0013268 A1 * | 1/2008 | Wong et al. ................ 361/683 |

\* cited by examiner

PORTABLE COMPUTER HARD DRIVE STRUCTURES

This application is a continuation of patent application Ser. No. 12/340,574, filed Dec. 19, 2008 now U.S. Pat. No. 8,179,673, which claims the benefit of provisional patent application No. 61/105,041, filed Oct. 13, 2008, both of which are hereby incorporated by reference herein in their entireties. This application claims the benefit of and claims priority to patent application Ser. No. 12/340,574, filed Dec. 19, 2008 and provisional patent application No. 61/105,041, filed Oct. 13, 2008.

BACKGROUND

This invention relates to electronic devices and, more particularly, to hard disk drive structures for electronic devices such as portable computers.

Designers of portable computers are faced with competing demands. For example, it is generally desirable to reduce the weight of a portable computer, so that a user is not burdened by an overly heavy device. At the same time, durability and aesthetics should not suffer. Often, weight can be saved, but only at the expense of reducing the size or strength of device components. Similarly, it may be possible to improve device appearance, but only at the expense of making a device more fragile and susceptible to damage. For example, it may be difficult to form robust hard drive mounting structures.

It would therefore be desirable to be able to provide improved hard drive mounting structures for electronic devices such as portable computers.

SUMMARY

Portable computers with improved hard disk drive subsystems are provided.

A hard disk drive subsystem may be provided that exhibits enhanced durability. The hard drive subsystem may have mounting structures that help to protect the drive from damage.

The hard drive mounting structures may include elastomeric support members. Each elastomeric support member may have a relatively rigid inner portion. The inner portion may include a hole that receives a hard drive mounting pin. Each elastomeric support member may also have a relatively flexible outer portion. The relatively flexible outer portion may be mounted within an opening in a plastic or metal support member. The rigid inner portion may have a square outline and may be mounted within a square opening in the flexible outer portion.

A noise reduction structure may be provided that helps to reduce vibration and associated noise in a hard drive. The noise reduction structure may have a planar member such as a copper-weighted sheet, a stainless steel-weighted sheet, or any other structure that has a suitable weight. The member may be mounted to the planar surface of a hard disk drive with adhesive.

Further features of the invention, its nature and various advantages will be more apparent from the accompanying drawings and the following detailed description of the preferred embodiments.

DETAILED DESCRIPTION

The present invention relates to portable computer structures. Portable computer structures may be provided that enhance the functionality of a portable computer while retaining or even improving desired levels of durability and aesthetics.

Figure 1:
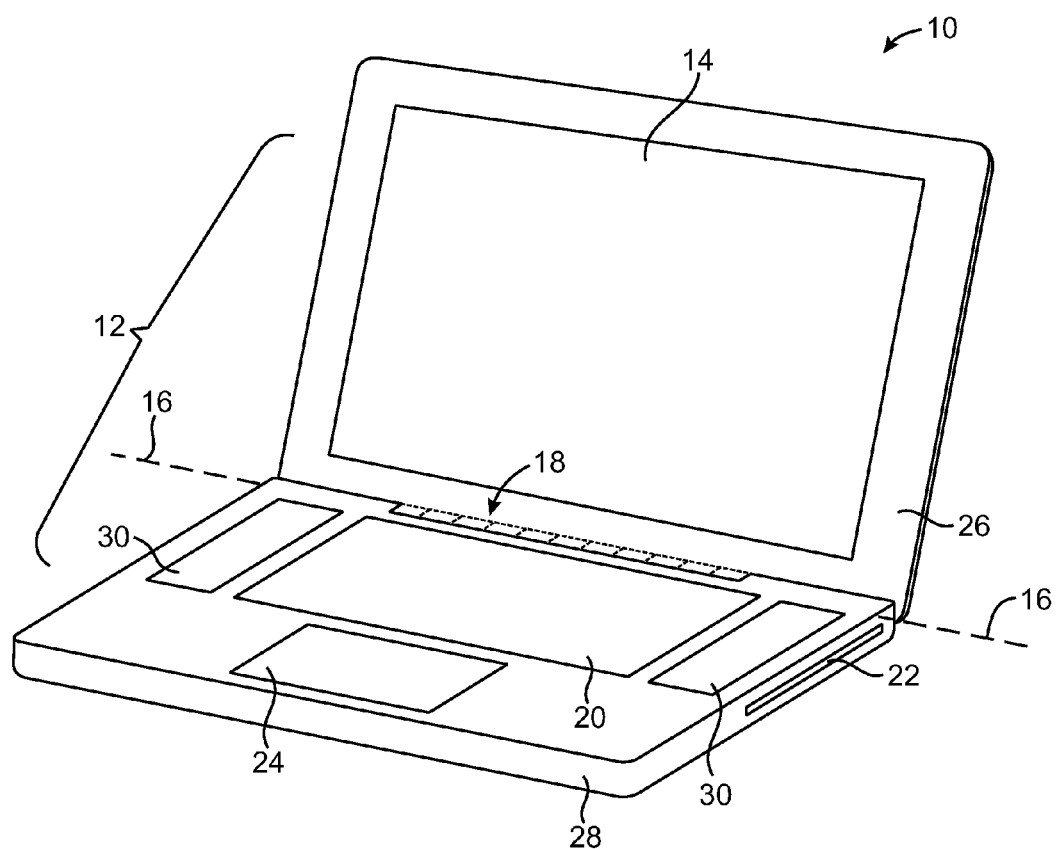
FIG. 1 is a perspective view of an illustrative portable computer in accordance with an embodiment of the present invention.

An illustrative electronic device such as a portable computer in which the portable computer structures may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. Ad advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted (e.g., from light-emitting diodes). This type of arrangement may be used, for example, to display status information to a user. Openings may also be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
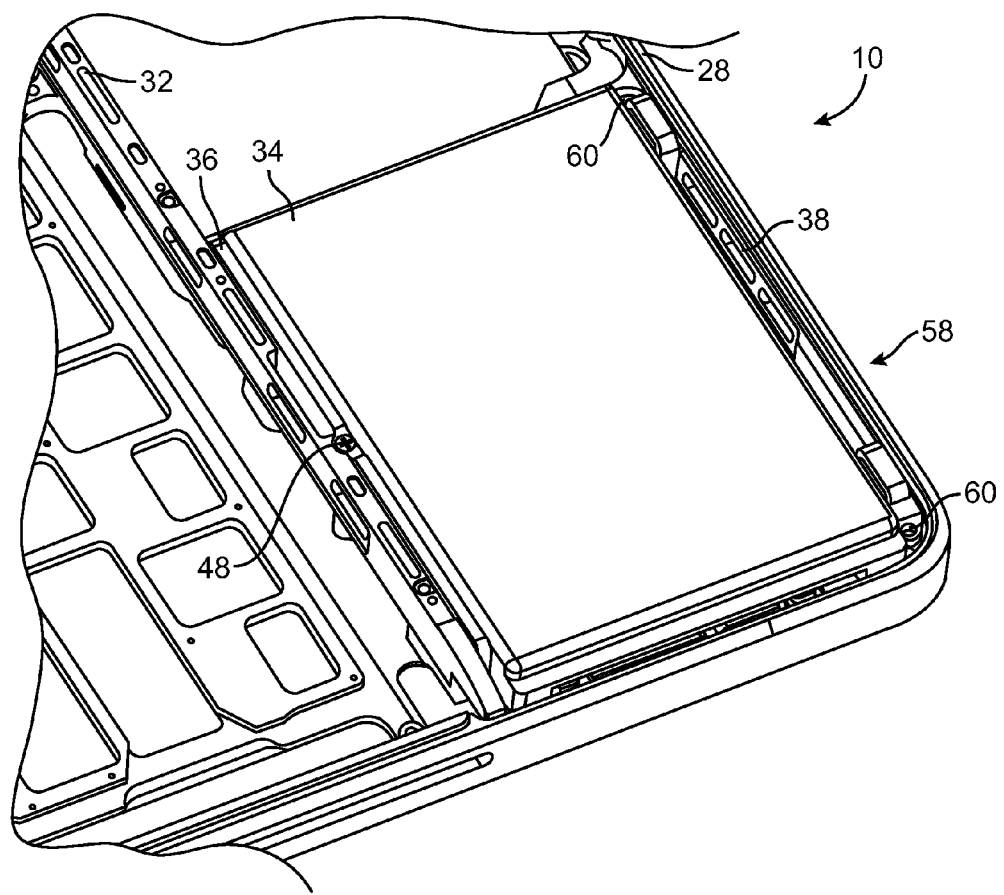
FIG. 2 is a perspective view of an interior portion of a portable computer showing an illustrative hard disk drive mounting location in accordance with an embodiment of the present invention.

Part of the interior of housing portion 28 of portable computer 10 is shown in FIG. 2. As shown in FIG. 2, hard disk drive 34 may be mounted within housing portion 28 using support members 36 and 38. Support members 36 and 38 may be formed from plastic or other suitable materials. Members such as members 36 and 38 are sometimes referred to as hard drive mounting brackets or support structures. Hard drive 34 may be mounted between front edge 58 of housing portion 28 and midwall 32 or may be mounted within housing portion 28 at another suitable location. Midwall 32, which may be formed from metal or other suitable materials, may be attached to housing portion 28 using screws, adhesive, welds, or other suitable attachment mechanisms. Members 36 and 38 may also be attached to housing portion 28 using adhesive and welds. To allow hard drive 34 to be removed for servicing, it may be advantageous to attach members 36 and 38 to housing portion 28 using a fastening mechanism that allows the nondestructive removal of hard drive 34. As an example, fasteners such as screws may be used. In the FIG. 2 example, screw 48 is used to attach member 36 to housing portion 28. Screws may also be inserted in holes in member 38 such as holes 60 to attach member 38 to housing portion 28.

Figure 3:
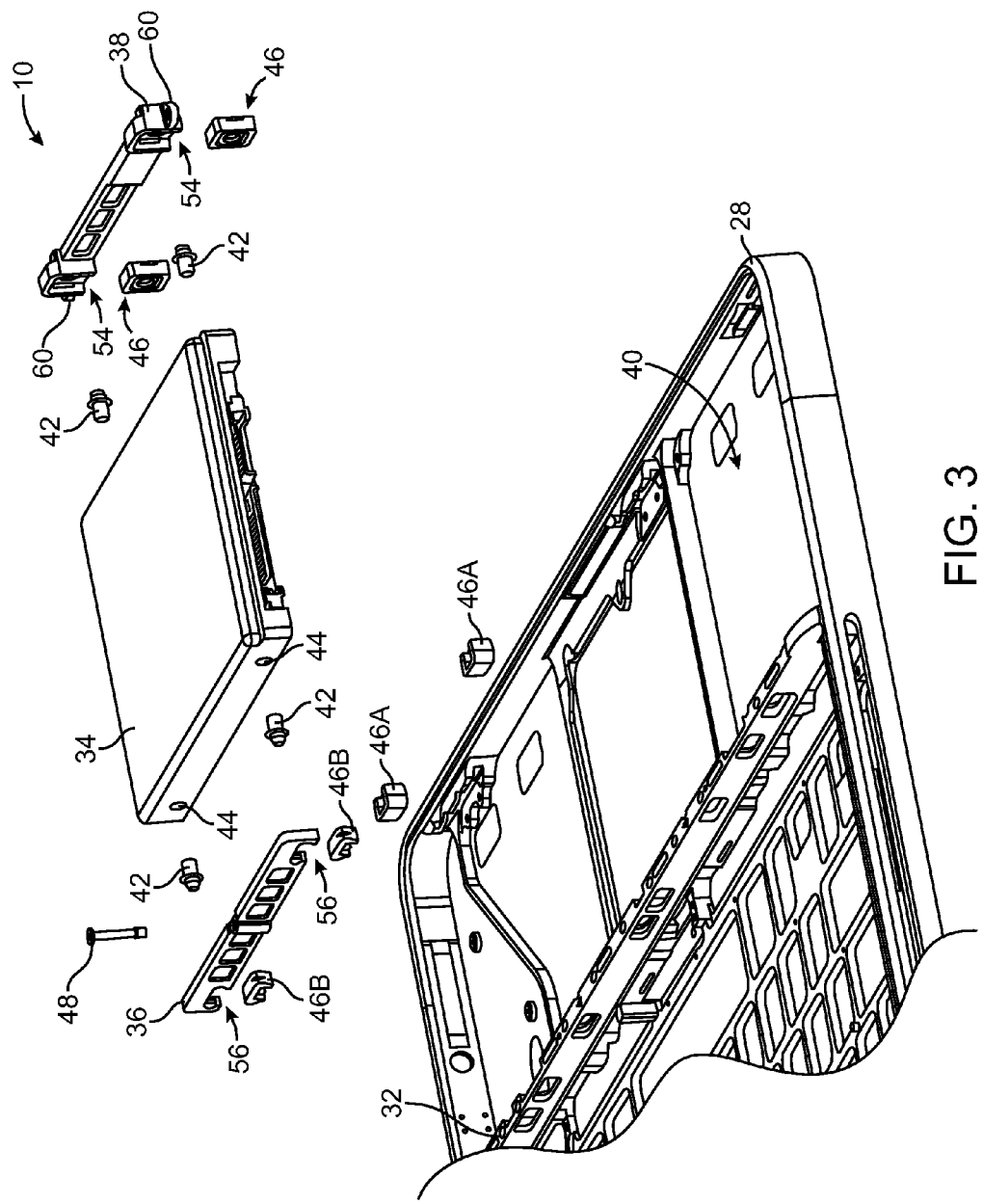
FIG. 3 is an exploded perspective view of illustrative structures that may be used in mounting a hard disk drive in a portable computer in accordance with an embodiment of the present invention.

An exploded perspective view of a portion of computer 10 in the vicinity of hard drive 34 is shown in FIG. 3. As shown in FIG. 3, hard drive 34 may be mounted in recessed region 40 of housing portion 28. Hard drive 34 may have threaded holes 44 into which hard drive mounting pins (screws) such as pins 42 may be screwed.

The exposed tips of pins 42 may be received by mating holes in members 46. Members 46, which are sometimes referred to a snubbers or bumpers, may be resilient. Upon impact, portions of members 46 may compress, thereby allowing the tips of pins 42 to move slightly. This absorbs part of the force of impact and prevents damage to hard drive 34. For example, upon an impact to device 10, the movement of pins 42 within members 46 may help to prevent damage to hard drive 34 by isolating hard drive 34 from the force of the impact.

Members 46 may be formed using a two-shot plastic molding process. An outer portion of each member 46 may be formed from a relatively soft elastomeric material, whereas an inner ring portion may be formed from a relatively harder material. Members 46 are recessed into holes 54 in member 38 and holes 56 in member 36. The members 46 that are associated with member 38 may each be provided as a single structure. The members 46 that are associated with member 36 may each be formed from two smaller half members 46A and 46B. The use of half members 46A and 46B allow the upper half members 46B to be removed when it is desired to release pins 42 (e.g., to remove hard drive 34 from computer 10 for servicing).

Figure 4:
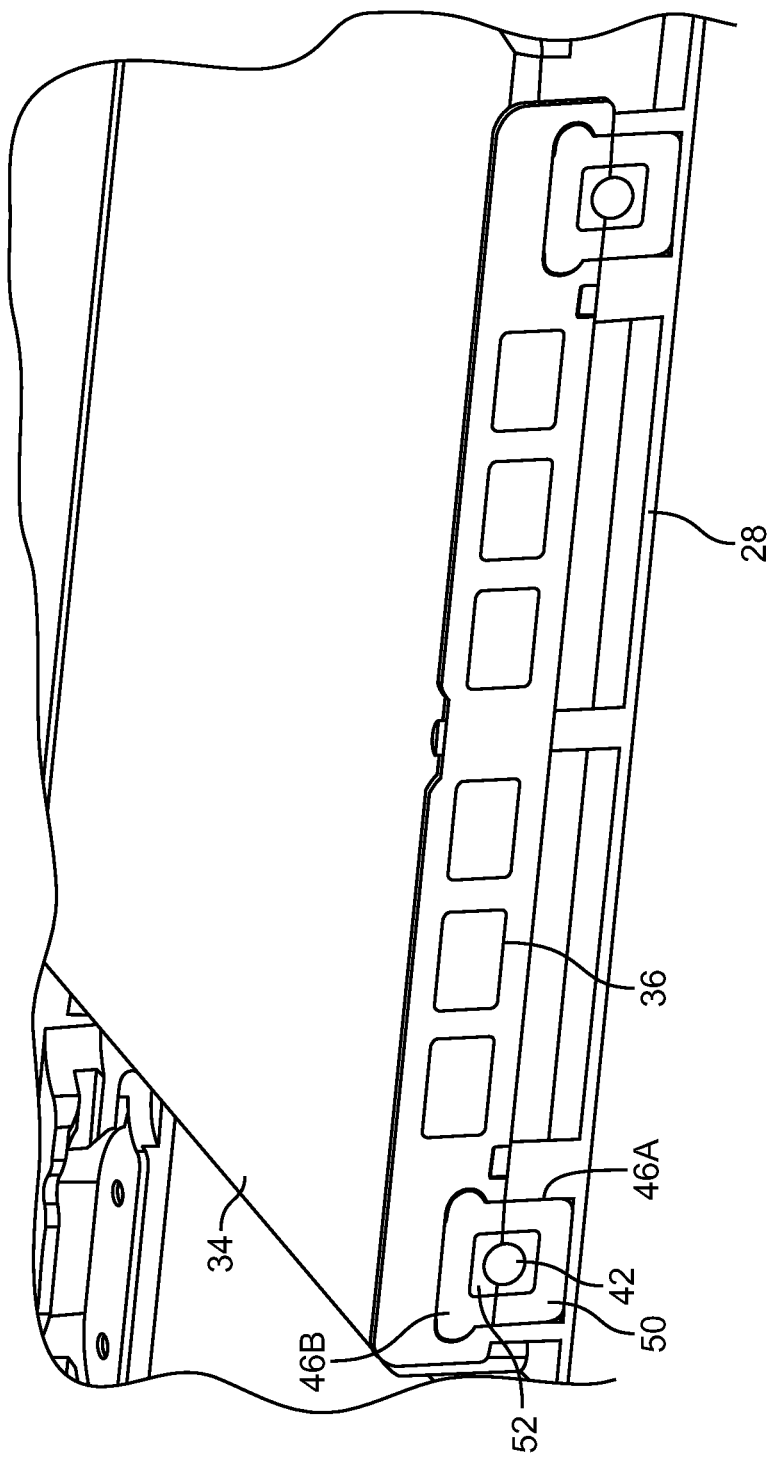
FIGS. 4 and 5 are partial cross sectional perspective views of illustrative hard disk drive mounting structures in accordance with an embodiment of the present invention.

The cross-sectional view of FIG. 4 shows how each of the two-part elastomeric members 46 may have an upper half portion 46B and a lower half portion 46A. Within each elastomeric member, outer ring portion 50 may be formed from a material that is soft enough to compress when hard drive 34 is subject to a sharp force (e.g., when computer 10 is inadvertently dropped or computer 10 is inadvertently struck against an object). Pins 42 are typically formed from metal or other rigid material. It can be difficult to form a well controlled interface between the relatively small round outer surface of pins 42 and a hole formed in a soft elastomer. Elastomeric support members 46 preferably have relatively rigid inner ring members 52 that help transfer force between pins 42 and soft outer ring members 50. It has been demonstrated that this type of arrangement makes it less likely that an unintended impact to device 10 will cause damage to hard drive 34.

Members 46 may be held in place by member 36 and lower housing portion 28. For example, as shown in FIG. 4, member 36 and housing portion 28 may bear against members 46A and 46B and thereby hold members 46A and 46B in place. With one suitable arrangement, lower half portion 46A can be mounted to structure 37 while upper half portion 46B is mounted to structure 36. In this type of arrangement, when member 36 is detached from device 10, members 46A and 46B may be split so that hard drive mounting pins 42 can slide out of the hole in the relatively rigid inner portion of member 46A (e.g., portion 52 of member 46A) and hard drive 36 can be removed from device 10.

In general, members 46 may be formed from any suitable material. For example, members 46 may be formed from an elastomeric material such as elastomeric foam, silicone, rubber, silicone rubber, a thermoplastic elastomeric (TPE) such as a thermoplastic polyurethane polymer, etc.

While members 46 are illustrated herein as being substantially rectangular in shape, members 46 may be formed in any suitable shape. For example, members 46 may be formed in shapes such as a circle, a square, a triangle, a rhombus, an ellipse, an oval, etc. If desired, outer ring portion 50 may have a different shape than inner ring portion 52. For example, the interface between inner ring portion 52 and outer ring portion 50 can be circular while the outer portion of outer ring portion 50 is square.

Figure 5:
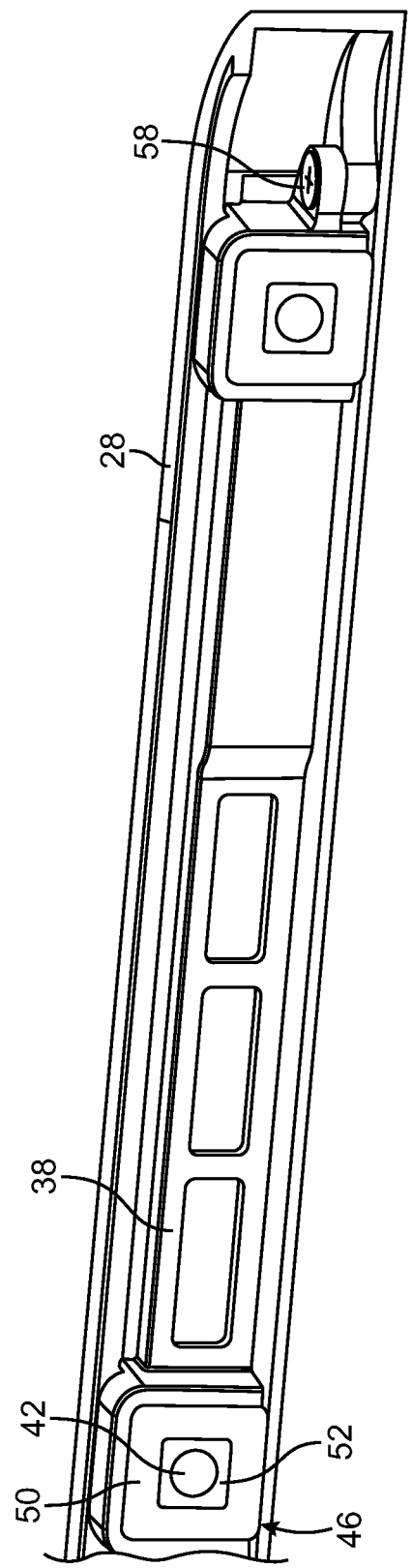

FIG. 5 shows a cross-sectional view of the elastomeric support members 46 associated with member 38. Members 46 of FIG. 5 may be formed from unitary (non-split) structures. If desired, members 46 of FIG. 5 may be split into structures of the type shown in FIG. 4 and members 46A and 46B of FIG. 4 may be formed using a single-piece design. The arrangement of FIGS. 4 and 5 is merely illustrative. As shown in FIG. 5, member 38 and lower housing portion 28 may bear against members 46 and thereby hold members 46 in place.

Moreover, each member 46 may be provided with additional materials (e.g., using a three shot process). The arrangement of FIGS. 4 and 5 in which each member is formed from a more rigid (less flexible) inner shot of material and a less rigid (more flexible) outer shot of material is merely illustrative.

Figure 6:
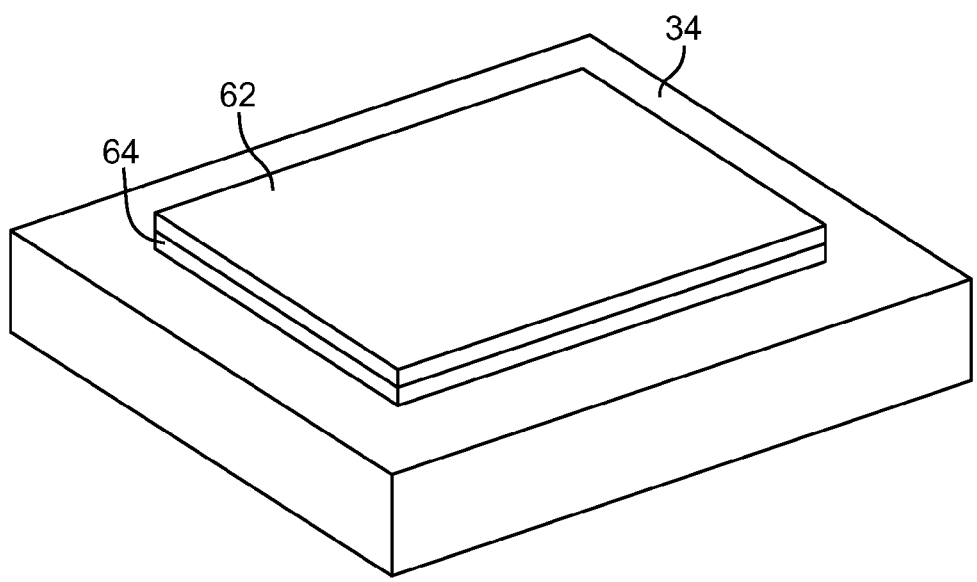
FIG. 6 is a perspective view of an illustrative noise reduction structure that may be mounted to a hard disk drive in accordance with an embodiment of the present invention.

If desired, a noise reduction structure may be provided that helps to reduce vibration and associated noise in hard drive 34. As shown in FIG. 6, hard drive 34 may be provided with a planar noise reducing member 62. Member 62 may include a planar sheet 62. Sheet 62 may be formed of copper or other relatively dense and heavy structure. Sheet 62 may be mounted to the planar surface of hard disk drive 34 with a layer of adhesive 64. A printed label may be provided on the outer surface of noise reduction sheet 62 if desired. Because sheet 62 is relatively heavy, the inclusion of sheet 62 alters that resonant frequency of hard drive 34 and helps to ensure that hard drive 34 does not resonate and produce sound in a sensitive frequency range (e.g., the human vocal range, which is approximately 80 Hz to 1100 Hz for the average human, and the human auditory range, which is approximately 20 Hz to 20 kHz for the average human). This helps to lessen the sonic impact of hard drive 34 during operation.

Hard drive 34 is described herein as an example of an illustrative component that can be mounted to the housing of device 10 using members 46 (e.g., members with a relatively soft outer portion and a relatively rigid inner portion). In general, any suitable component can be mounted to the housing of device 10 by members 46. For example, a battery, a main logic board, a circuit board, a display, and any other suitable components may be mounted to the housing of device 10 using members 46.

The foregoing is merely illustrative of the principles of this invention and various modifications can be made by those skilled in the art without departing from the scope and spirit of the invention.

What is claimed is:

1. Mounting structures for a component having at least one support pin, comprising:
    at least one support member having an opening; and
    an elastomeric support member having an outer portion that fits within the opening and an inner portion that has a hole that receives the pin, wherein the outer portion is softer than the inner portion.

2. The mounting structures defined in claim 1, wherein the mounting structures are part of an electronic device having a housing and wherein the support member comprises a component mounting bracket that secures the elastomeric support member to the housing of the electronic device.

3. The mounting structures defined in claim 2 further comprising a fastening mechanism that attaches the component mounting bracket to the housing of the electronic device.

4. The mounting structures defined in claim 2 further comprising a fastening mechanism that attaches the component mounting bracket to the housing of the electronic device and that allows the nondestructive removal of the component mounting bracket from the housing of the electronic device.

5. The mounting structures defined in claim 4 wherein, when the component mounting bracket is attached to the housing of the electronic device, the component mounting bracket and the housing of the electronic device bear against the elastomeric support member and secure the elastomeric support member in place.

6. The mounting structures defined in claim 1 wherein the elastomeric support member is split into a first portion and a second portion and wherein the first portion and the second portion each comprises a part of the outer portion and a part of the inner portion.

7. The mounting structures defined in claim 1 wherein the hole in the inner portion of the elastomeric support member is circular.

8. The mounting structures defined in claim 7 wherein the inner portion and the outer portion of the elastomeric support member have a rectangular interface.

9. The mounting structures defined in claim 8 wherein the opening in the support member is rectangular.

10. The mounting structures defined in claim 1 wherein the elastomeric support member comprises a thermoplastic polymer support member that is formed in a two-shot molding process.

11. The mounting structures defined in claim 1 wherein the component has at least four support pins and wherein the at least one support member comprises at least two support members each of which has at least two openings, the mounting structures further comprising:
    at least three elastomeric support members each of which has an outer portion that fits within one of the openings and an inner portion that has a hole that receives one of the support pins, wherein the outer portion of each of the elastomeric support members is softer than the inner portion.

12. Mounting structures for an electronic device having a component and a housing, wherein the component has at least one support pin, the electronic device comprising:
    at least one elastomeric support having an outer member that is secured to the housing and an inner member that has a hole that receives the pin, wherein the outer member is more flexible than the member portion.

13. The mounting structures defined in claim 12 further comprising:
    at least one support member having an opening, wherein the outer member fits within the opening.

14. The mounting structures defined in claim 13 wherein the support member is removably secured to the housing by a fastening mechanism.

15. The mounting structures defined in claim 12 further comprising:
    a component mounting bracket that removably secures the elastomeric support to the housing of the electronic device; and
    at least one screw that secures the component mounting bracket to the housing.

* * * * *